(12) United States Patent
Mahmood et al.

(10) Patent No.: US 12,365,962 B2
(45) Date of Patent: Jul. 22, 2025

(54) PROCESS TO RECOVER ALKALI FROM A METAL OXIDE/HYDROXIDE CONTAINING MATERIAL

(71) Applicant: FPInnovations, Pointe-Claire (CA)

(72) Inventors: Talat Mahmood, Kirkland (CA); Naceur Jemaa, Pointe-Claire (CA)

(73) Assignee: FPInnovations, Pointe-Claire (CA)

( * ) Notice: Subject to any disclaimer, the term of this patent is extended or adjusted under 35 U.S.C. 154(b) by 659 days.

(21) Appl. No.: 17/607,467

(22) PCT Filed: Apr. 28, 2020

(86) PCT No.: PCT/CA2020/050555
§ 371 (c)(1),
(2) Date: Oct. 29, 2021

(87) PCT Pub. No.: WO2020/220117
PCT Pub. Date: Nov. 5, 2020

(65) Prior Publication Data
US 2022/0228236 A1 Jul. 21, 2022

Related U.S. Application Data

(60) Provisional application No. 62/839,942, filed on Apr. 29, 2019.

(51) Int. Cl.
*C22B 7/00* (2006.01)
*C22B 26/10* (2006.01)

(52) U.S. Cl.
CPC .............. *C22B 7/008* (2013.01); *C22B 26/10* (2013.01)

(58) Field of Classification Search
CPC ........... C22B 7/008; C22B 26/10; C22B 7/02; C01D 1/28; C01D 1/22; C01D 7/00; C01F 5/24
See application file for complete search history.

(56) References Cited

U.S. PATENT DOCUMENTS 2,211,908 A 8/1940 O'Connor
3,258,391 A 6/1966 Cornell et al.
(Continued)

FOREIGN PATENT DOCUMENTS

CA 2125695 6/1993
GB 1407276 9/1975
WO WO-2011020949 A1 * 2/2011 ............... C01D 1/04

OTHER PUBLICATIONS

Manaa, "Selective Leaching of Vanadium from oiler oiled Ash Residue Using Sodium Carbonate-Bicarbonate Binary Solution", Chemical Technology India Journal, vol. 13(1):124, pp. 1-11. 2018.

*Primary Examiner* — Anthony M Liang
(74) *Attorney, Agent, or Firm* — Norton Rose Fulbirght Canada

(57) ABSTRACT

A process for recovering alkali from power boiler ash is provided. The power boiler ash is first contacted with $Na_2CO_3$ to produce a mixture containing settling and non-settling solid particles. A fraction of the settling particles is then separated from the mixture to produce a first clarified alkaline solution. The first clarified alkaline solution contains species such as NaOH and KOH depending upon the power boiler ash characteristics. The non-settling solid particles may optionally be further separated from the first clarified alkaline solution to obtain a second clarified alkaline solution. This process is also applicable for the extraction of alkali from other oxide/hydroxide containing materials.

9 Claims, 2 Drawing Sheets

(56) References Cited

U.S. PATENT DOCUMENTS

| | | |
|---|---|---|
| 5,993,772 A | 11/1999 | Ninane et al. |
| 6,403,045 B1 | 6/2002 | Daviller et al. |
| 7,291,245 B2 | 11/2007 | Ai et al. |
| 9,719,209 B2 | 8/2017 | McKeough |
| 2003/0194361 A1 | 10/2003 | Westerberg et al. |
| 2011/0214535 A1* | 9/2011 | Vandor .............. B01D 53/1475 423/244.01 |
| 2013/0129601 A1 | 5/2013 | Sohara |
| 2015/0086452 A1 | 3/2015 | Worsley |
| 2017/0183237 A1 | 6/2017 | Vandendoren |

* cited by examiner

PROCESS TO RECOVER ALKALI FROM A METAL OXIDE/HYDROXIDE CONTAINING MATERIAL

CROSS-REFERENCE TO RELATED APPLICATION

The present application is a U.S. National Phase of International Application No. PCT/CA2020/050555, filed on Apr. 28, 2020, and claims benefit of U.S. Provisional Application No. 62/839,942 filed Apr. 29, 2019, the content of which are hereby incorporated by reference in their entirety.

TECHNICAL FIELD

The present disclosure relates to processes for recovering alkali from a metal oxide/hydroxide containing material, and specifically to processes for recovering alkali (caustic) from biomass/coal power boiler ash.

BACKGROUND

The majority of ash generated by the pulp and paper industry is landfilled at high cost in current practice. This is anticipated to worsen over time as the industry increases its reliance on hog fuel as a green energy source thereby generating even more ash. A strategy to address high ash management cost is to recover valuable products from it. Unfortunately, this concept has not gained much popularity because of high processing and hauling costs involved as well as the relatively low value of the products identified from ash. This underscores the need to develop those products or uses of ash which do not require significant hauling or extensive processing. This strategy together with a focus on value-added products would result in economically sustainable products manufacturing from ash. One such application is to recover/produce alkali (mainly caustic) from ash at the pulp mill site and use it to replace at least a portion of the purchased caustic. The on-site production and use of caustic will minimize hauling cost. As well, the high value of the recovered alkali (caustic costs $600-1,000/tonne) will make the process economics attractive. The technology transfer potential is very high as there is shortage of caustic in market due to increased demand and the ban in Europe on the mercury-based caustic production process.

Kraft pulp mills may generate two types of ash, i.e. ash from a recovery furnace (boiler) and ash from a power boiler. The recovery boiler ash is generated at all kraft pulp mills and is an integral part of the chemical recovery process. The recovery boiler ash mainly consists of sodium, sulphate, carbonate, chloride, and potassium (Jemaa et al., 1999, "The Kraft Recovery Boiler Dust Using the Precipitator Dust Purification (PDP) System", Pulp and Paper Canada-Ontario, 100 (7): 46-53) as shown in Table 1. The composition of the recovery boiler precipitator ash varies from one mill to another depending on the operation of the recovery boiler. In current industry practice, the recovery boiler ash is mainly incorporated into the chemical recovery cycle of a kraft mill with a small amount being wasted to purge non-process elements from the system such as $Cl^-$ and $K^+$ if needed.

TABLE 1

Typical composition of recovery boiler ash (PRIOR ART).

| Species | Recovery Boiler Ash (weight %) |
|---|---|
| $SO_4^{2-}$ | 54.6 |
| $CO_3^{2-}$ | 3.8 |
| $Cl^-$ | 2.0 |
| $Na^+$ | 25.7 |
| $K^+$ | 10.3 |

The power boiler ash, on the other hand, is only generated when a mill (kraft or mechanical) combusts hog fuel. The composition of the power boiler ash from three mill sources and that from a facility combusting paper sludge is reported in Table 2. Data in Table 2 show that ash from combustion processes mainly consists of oxides of metals such as Na, K, Ca and Mg.

TABLE 2

Composition of power boiler ash from three sources and paper sludge ash. Mills A, B and C mainly burn hog fuel (mainly wood ash). (PRIOR ART).

| Species | Mill A (%) | Mill B (%) | Mill C (%) | Paper Sludge Ash |
|---|---|---|---|---|
| Minerals | | | | |
| $SiO_2$ | 3.5 | 9.7 | 8.1 | 21.6-30.2 |
| $Al_2O_3$ | 12.5 | 19.6 | 17.2 | 13.2-18.86 |
| $Fe_2O_3$ | 12.9 | 8.3 | 7.6 | |
| CaO | 14.5 | 7.2 | 7.8 | 31.4-45.5 |
| MgO | 7.7 | 3.5 | 5.3 | 2.35-5.15 |
| $Na_2O$ | 3.3 | 2.4 | 3.8 | 0.21-1.56 |
| $SO_3$ | 2.6 | 4.9 | 3.5 | |
| $Ca(OH)_2$ | 6.9 | 3.1 | 2.9 | |
| MnO | 0.8 | 0.4 | 0.7 | 0.04-0.1 |
| K2O | 3.9 | 2.6 | 3.9 | 0.32-1.31 |
| $TiO_2$ | 2.1 | 5.5 | 6 | 0.26-0.7 |
| $CaSO_4$ | 3.9 | 9.5 | 6.3 | |
| $CaCO_3$ | 3.5 | 4.6 | 2.7 | |
| $P_2O_5$ | 14.1 | 9.8 | 13.4 | 0.18-0.4 |
| $Ca_2Al_2O_6$ | 7.7 | 9.1 | 10.6 | |
| Anions | | | | |
| $SO_4^{2-}$ | | 0.067 | | |
| $CO_3^{2-}$ | | 0.288 | | |
| $Cl^-$ | | 0.262 | | |

Tables 1 and 2 show clearly that the recovery boiler and power boiler ashes are very different in composition. Sulphate and carbonate concentrations are approximately three and one order of magnitude smaller in power boiler ash as compared to those in recovery boiler ash, respectively. The composition of the recovery boiler ash is generally not as variable as it is in the case of power boiler ash. These variations in power boiler ash quality stem from differences in fuel composition, boiler operating conditions and the nature of the air purification equipment used. In contrast to recovery boiler ash, the power boiler ash mainly consists of oxides of silica, calcium, aluminum, and iron with carbonate, chloride and sulphate typically being present in relatively insignificant concentrations. While most of the recovery boiler ash is recycled to the process, 80-90% of the power boiler ash is landfilled in Canada (Mahmood and Elliott, 2017, "A Novel Approach to Recover Products from Ash", proceedings of the PaperWeek 2017 conference held in Montreal, Quebec) and in the U.S. at a high cost. Also reported in Table 2 are properties of ash generated from paper mill sludge combustion. These data show that paper sludge ash can be very high in metal oxides (Amit and Islam, 2016, "Application of paper sludge ash in construction industry-A review, Proceedings of the 3rd International Conference on Civil Engineering for Sustainable Development" (ICCESD 2016), 12~14 Feb. 2016, KUET, Khulna, Bangladesh). It has been reported that the most abundant oxides in this type of ash are: CaO, $Al_2O_3$, MgO and $SiO_2$. As indicated in Table 2, the CaO content alone ranges between 31.4-45.5% which makes this ash very attractive for caustic production and recovery.

Some municipalities incinerate/combust solid waste or sludge generated by their wastewater treatment facilities. Ash generated from such facilities could also hold potential to generate caustic.

U.S. 2016/0289793 discloses alkali extraction from recovery boiler ash, not power boiler ash. As shown in Table 1 above, recovery boiler and power boiler ashes have a very different composition. The recovery boiler ash is rich in sulphate and contains some carbonate so this disclosure teaches leaching the ash using a solution containing calcium oxide or calcium hydroxide. Conversely, the power boiler ash mainly consists of $SiO_2$, $Al_2O_3$, CaO and $Fe_2O_3$ with several other metals and minerals being present in small but varying concentrations. It is well known that the power boiler ash composition varies dramatically with hog fuel quality and the combustion parameters while the recovery boiler ash is fairly consistent in quality across the industry. In the case of recovery boiler ash reported in Table 1, a small amount of sodium carbonate (3.8%) is present in the ash and leaching with a solution containing calcium is used to generate alkalinity. The alkaline solution is contaminated with chloride and potassium and it was proposed to use it outside the recovery cycle. The recovery boiler ash contains small quantities of carbonate as indicated in Table 2 and leaching is not an effective approach to remove any significant amount of caustic. In addition, a significant amount of sulfate will be lost due to the formation and precipitation of calcium sulphate. Generally, the recovery boiler ash is recycled to maintain the sodium sulfur balance and any sulfur loss has to be avoided to reduce make up chemicals cost. Another limitation of this disclosure is the fact that when lime solution is added to the recovery boiler ash, precipitates of calcium carbonate and calcium sulphate are formed. These calcium species accumulate in the recovery boiler ash and eventually enter the recovery cycle when the ash is returned to the process. This is not desirable as calcium in the recovery cycle creates deposition problems with evaporators and heat exchangers.

U.S. 2016/0289793 also discloses a one-step process to recover alkali which is only applicable to kraft pulp mills. This is because recovery boiler ash is relatively pure with consistent quality. Ash from power boilers, on the other hand, is a complex mix of numerous ingredients with many impurities being present. As such, the alkali recovered from the power boiler ash will have to be purified in a second step for value-added applications or the ash might have to be leached with water first to reject water soluble impurities. Also, the product recovered is recommended to be used in the bleaching process which will cause serious scaling issues. The sulphate ion present in the recovery boiler ash will leach with the alkali causing serious scaling issues (i.e., barium sulfate) in the bleach plant.

Furthermore, U.S. 2016/0289793 also discloses using carbonate ion in recovery boiler ash to react with the added calcium hydroxide solution. So, the reaction is limited to calcium-based chemistry. Other metal oxides (for example $Na_2O$ and $K_2O$) which are only present in power boiler ash (Table 2), and hold better potential to produce NaOH and KOH, are not recovered. This means a low alkali yield from the recovery boiler ash which typically contains 3.8% carbonate by weight (Table 1). From stoichiometric calculations, a typical carbonate concentration of 3.8% (limiting reactant) will generate a maximum of around 4 g NaOH/100 g ash assuming a reaction efficiency of 80% (i.e., approximately 4% yield). The yield will increase to around 10% assuming unrealistically high carbonate content (10%) of the recovery boiler ash. Another issue in using the method taught in this disclosure is the extremely dilute nature of the produced caustic. This is because $Ca(OH)_2$ (the leaching solution) is sparingly soluble in water with solubility at 20° C., 80° C. and 100° C. being 1.73 g/L, 0.86 g/L and 0.66 g/L, respectively. When $Ca(OH)_2$ solution is added to the recovery boiler ash, even at saturation concentration, it will produce caustic at <0.2% concentration. Such dilute caustic solution is practically useless for any serious application onsite or for hauling the product off-site for an alternative use.

There is accordingly still a need to provide processes for recovering alkali from a metal oxide/hydroxide containing material, such as power boiler ash, that address the deficiencies highlighted above.

SUMMARY

It is provided a process for recovering alkali from a metal oxide/hydroxide containing material comprising the steps of contacting the metal oxide/hydroxide containing material with $Na_2CO_3$ to obtain a mixture, wherein the mixture comprises settling solid particles, non-settling solid particles and alkali generated during the contacting step; and separating a fraction of the solid particles from the mixture to obtain a clarified alkaline solution.

It is particularly provided a process for recovering alkali from power boiler ash, comprising the steps of contacting the power boiling ash with $Na_2CO_3$ to obtain a mixture, wherein the mixture comprises settling solid particles, non-settling solid particles and alkali generated during the contacting step; and separating a fraction of the solid particles from the mixture to obtain a clarified alkaline solution.

It is provided process for recovering alkali from inorganic waste materials comprising the steps of contacting the inorganic waste materials containing $Na_2O$ and $K_2O$ with $Na_2CO_3$ to obtain a slurry, wherein the slurry comprises settling solid particles, non-settling solid particles and alkali generated during the contacting step; and separating a fraction of the solid particles from the slurry to obtain a clarified alkaline solution.

In an embodiment, the inorganic waste materials is cement or a biomass.

In a further embodiment, wherein the inorganic waste materials is a power boi ash.

In an embodiment, the concentration of the alkaline solution is in the range of 0.5-20%.

In an embodiment, the concentration of the alkaline solution is in the range of 5-10%.

In a further embodiment, the power boiler ash comprises either one of $K_2O$, $Na_2O$, CaO, MgO, $Ca(OH)_2$, or a combination thereof.

In another embodiment, the power boiler ash is fly ash.

In a particular embodiment, the power boiler ash is bottom ash.

In an embodiment, the power boiler ash is combined ash.

In a further embodiment, the $Na_2CO_3$ is in solubilized form.

In an additional embodiment, the $Na_2CO_3$ is pure.

In a further embodiment, the $Na_2CO_3$ is derived from green liquor of a kraft mill or that from a closed cycle BCTMP pulp mill.

In an embodiment, the $Na_2CO_3$ is in dry form.

In a further embodiment, the $Na_2CO_3$ has a concentration of between about 5% and about 90% of the power boiler ash by dry weight.

In another embodiment, the fraction of the settling solid particles separated from the mixture settles at a bottom of a reaction tank.

In a further embodiment, the process described herein further comprises recovering the fraction of the settling solid particles in the form of a residual slurry.

In an embodiment, the first clarified alkaline solution is depleted from the fraction of the settling solid particles. The gravity settling of solid fraction (the first clarification step) can be replaced by the direct use of solid/liquid separation equipment such as vacuum filter, pressure filter or a centrifuge.

In another embodiment, the concentration of alkali in the first clarified alkaline solution is between about 2 g/L and about 38 g/L.

In another embodiment, an alkali yield defined as a mass of alkaline in g per 100 g mass of metal oxide/hydroxide containing material is of at least 5%.

In an embodiment, the alkali yield is of at least of 5 to 40%, preferably of at least 10%, in some cases at least 20%, in some cases at least 30%, in some cases at least 35%, in some cases at least 40%.

In a further embodiment, the process described herein further comprises separating a fraction of the non-settling solid particles from the first clarified alkaline solution to obtain a second clarified alkaline solution.

In another embodiment, separating the fraction of non-settling solid particles comprises using a pulse filter, a membrane-based separation unit, a pressure filter, vacuum filter, filter press, a fabric filter, a centrifuge or any combination thereof.

BRIEF DESCRIPTION OF THE FIGURES

Reference will now be made to the accompanying drawings.

It will be noted that throughout the appended drawings, like features are identified by like reference numerals.

DETAILED DESCRIPTION

In accordance with the present disclosure, a process for recovering alkali from a metal oxide (e.g., $Na_2O$, $K_2O$, $CaO$ and $MgO$) or metal hydroxide containing material is provided.

It is provided process for recovering alkali from power boiling ash, comprising the steps of contacting the power boiling ash with $Na_2CO_3$ to obtain a mixture, wherein the mixture comprises settling solid particles, non-settling solid particles and alkali generated during the contacting step; and separating a fraction of the solid particles from the mixture to obtain a clarified alkaline solution.

The process provided herein applies universally to a range of oxides of metals such as MgO and thus to a variety of materials and not just to ashes resulting from the combustion of biomass or the chemical recovery process. As an example, the process encompassed herein applies to alkali production from cement.

Figure 1:
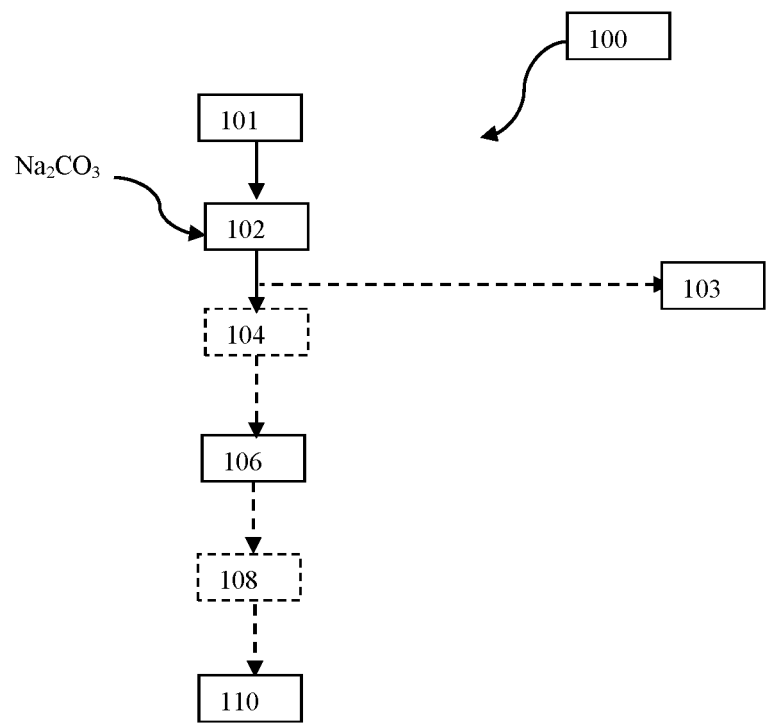
FIG. 1 shows a process for recovering alkali from power boiler ash in accordance in accordance to an embodiment.

In one non-limiting embodiment, with reference to FIG. 1, a process 100 for recovering alkali (polished alkaline solution 110) from a power boiler ash is shown. In a first step 102, the powder or slurried boiler ash 101 is contacted with $Na_2CO_3$, $Na_2CO_3$ being preferably in solution or solubilized form, to form a mixture. In an embodiment, the process 100 can comprise a preliminary leaching step with water to remove water-soluble impurities. The power boiler ash may be fly, bottom or combined ash. The term fly ash refers to the portion of ash that escapes the combustion zone with flue gas. The bottom ash refers to the heavier ash particles collected at the bottom of the boiler. The combined ash refers to a situation where the fly ash and bottom ash after generation are combined before final disposal. In one non-limiting example, the power boiler ash contains oxides/hydroxides of metals (such as but not limited to $Na_2O$, $CaO$, $MgO$ and $Ca(OH)_2$), which are sources of hydroxide alkalinity (i.e., of hydroxyl ions $OH^-$), as well as some carbonate and other anion-based species. In other non-limiting embodiments, the process 100 may be used on any other metal oxide/hydroxide containing material, such as but not limited to any suitable industrial material or process by-product including cement, biomass and the likes.

It is appreciated that, when $Na_2CO_3$ in solubilized form is used, at least a fraction of water-soluble impurities present in the power boiler ash may also be removed, as further described below. The $Na_2CO_3$ used at step 102 may be any commercially-available, pure $Na_2CO_3$ or $Na_2CO_3$ from green liquor (GL) from a chemical pulp mill. In the latter case, alkali recovery according to the process 100 may or may not be integrated as part of the chemical recovery cycle of a kraft mill. In this embodiment, $Na_2CO_3$ may be present during step 102 at a concentration of between about 5% and about 90% of the power boiler ash by dry weight depending on the level of oxides/hydroxides present in the ash. However, in most situations a sodium carbonate to ash ratio of 20-60% would suffice.

The oxides/hydroxides present in the power boiler ash can react with water and/or the $Na_2CO_3$ in the mixture as shown in Equations 1-5 below.

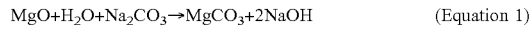

$MgO + H_2O + Na_2CO_3 \rightarrow MgCO_3 + 2NaOH$  (Equation 1)

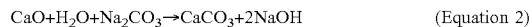

$CaO + H_2O + Na_2CO_3 \rightarrow CaCO_3 + 2NaOH$  (Equation 2)

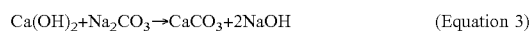

$Ca(OH)_2 + Na_2CO_3 \rightarrow CaCO_3 + 2NaOH$  (Equation 3)

$Na_2O + H_2O \rightarrow 2NaOH$  (Equation 4)

$K_2O + H_2O \rightarrow 2KOH$  (Equation 5)

In an embodiment, $Na_2CO_3$ reacts with metal (both calcium and non calcium-based) oxides present in the power boiler ash to form solid particles and alkali (in hydroxide form) in the mixture. The solid particles produced are mostly carbonate compounds, for example $MgCO_3$ and/or $CaCO_3$.

As further described below, the solid particles in the mixture may be settling or non-settling (i.e., suspended, colloidal and/or dissolved). In the non-limiting example in which $Na_2CO_3$ is in solution: (i) $Na_2O$ and $K_2O$ present in the power boiler ash produce NaOH and KOH, respectively, by reacting with water according to Equations (4) and (5) above; and (ii) other metal oxides such as MgO, CaO and $Ca(OH)_2$ produce NaOH by reacting with $Na_2CO_3$ according to Equations (1), (2) and (3) above. Any other suitable alkali may be formed in other non-limiting examples.

The first step 102 may be performed in any suitable reaction tank. To increase the kinetics of the reaction(s) in the reaction tank, agitation, sonication or heating, may be used during the first step 102.

In a second optional step 104, a fraction of the settling solid particles generated during the contacting step 102 is separated from the mixture to form a first clarified alkaline solution. In this embodiment, the fraction of the settling solid particles settles at the bottom of the reaction tank such that they may be separated from the mixture in the reaction tank. In one non-limiting example, the fraction of the settling solid particles that settles at the bottom of the reaction tank may be recovered in the form of a residual slurry 103. The resulting residual slurry has high calcium carbonate content and can be used in construction, in agriculture and as a neutralizing agent (e.g. for pH adjustment). It is appreciated that, in this embodiment, the first clarified alkaline solution is therefore depleted from the fraction of the settling solid particles generated during the contacting step 102.

The first clarified alkaline solution that is depleted from the fraction of the settable solid particles generated during the contacting step 102 may exhibit levels of residual solid particles of between 0.1% and 10%, the residual solid particles comprising both the non-settling solid particles as well as settable solid particles that were not separated from the mixture at the second step 104. When the level of residual suspended solid particles is below 0.01%, the first clarified alkaline solution may be used directly, for example in applications such as make-up caustic, bleaching and neutralization agent as well as total reduced sulphur (TRS) scrubber solution. Still in this embodiment, the first clarified solution has a concentration of alkali (NaOH) in solution of between about 2 g/L and about 38 g/L. In an embodiment, the caustic solution generated has a concentration of between 4-10%. It is appreciated that when purchased $Na_2CO_3$ or that derived from GL is used, the desired alkaline (NaOH) concentration may be controlled via the fly ash to liquor (or water) ratio. With appropriate process conditions an alkali concentration of 10% (100 g/L) or even higher can be obtained. Still in this embodiment, the first clarified alkaline solution has an alkali yield (i.e., a mass of NaOH and/or KOH in g per 100 g dry power boiler ash) of 5 to 40%, preferably of at least 10%, in some cases at least 20%, in some cases at least 30%, in some cases at least 35%, in some cases at least 40% and in some cases even more. In an embodiment, the settling step 104 is skipped and the mixture sent directly to a solid/liquid separation 106 device such as a pressure, vacuum or a fabric filter (see FIG. 1). Another option is to send the mixture to the sewer of a plant where the use of lime is required to neutralize acids. The direct release of the solids from 102 will serve as an alkali and will neutralize the acids.

In step 106, the first clarified alkaline solution, depleted in the fraction of the settleable solid particles generated during the contacting step 102 or contributed by the ash, may be subjected to a further separation step in which a fraction or all of the settleable or non-settleable (i.e., suspended, colloidal and/or dissolved) solid particles and ions is separated from the first clarified alkaline solution or the slurry flowing directly from 102 to 106 to obtain a (second) clarified alkaline solution. In this embodiment, the step 106 may be performed by using a physical separation method, such as for example a membrane-based separation unit, a centrifuge, a pressure filter, a vacuum filter, a belt press or any other suitable separation technique in other embodiments. The clarified alkaline solution from 106 is therefore substantially depleted of solid particles generated during the contacting step 102 or contributed by ash. The clarified alkaline solution from 106 may then be stored in a tank for on-site consumption or subsequent shipment, the clarified alkaline solution being used for example in applications such as neutralization, bleaching, use in scrubbers, as caustic make up, as a solution to regenerate demineralization resins and membranes. In other non-limiting embodiments, the clarified alkaline solution from 106 may optionally be further purified or concentrated via reverse osmosis, nanofiltration or ultrafiltration or any other suitable process.

It is appreciated that the process 100 may be applied in the context of any mill (including kraft mills and mechanical pulp mills) or any biomass (or coal) fired cogeneration power plant. Some mechanical pulp mills such as closed cycle bleached chemi-thermomechanical pulp (BCTMP) mills produce a waste inorganic stream, after burning their heavy liquor, which is rich in sodium carbonate. Presently, this stream is landfilled. These types of pulp mills are not equipped with a causticizing plant to make use of the $Na_2CO_3$ and produce alkali (caustic). This $Na_2CO_3$-rich stream can be dissolved in water and used to recover caustic from ash. The NaOH can be employed for example in the bleach plant. The caustic stream can be purified if needed to remove any undesirable species, non process elements (NPEs) that may affect bleach plant operations.

The product obtained from the process described herein is clean enough to be used in applications such as bleaching, as make up caustic, as scrubbing solution for total reduced sulfur (TRS) removal and as a neutralization agent. However, if the recovered product needs refinement, an additional optional step 108 can be included to remove colloidal or dissolved species (NPEs) in the recovered alkali 110. Technologies to do so include but are not limited to membranes processes, ion exchange resins, surface adsorption and evaporation or a combination of them.

Example I

Figure 2:
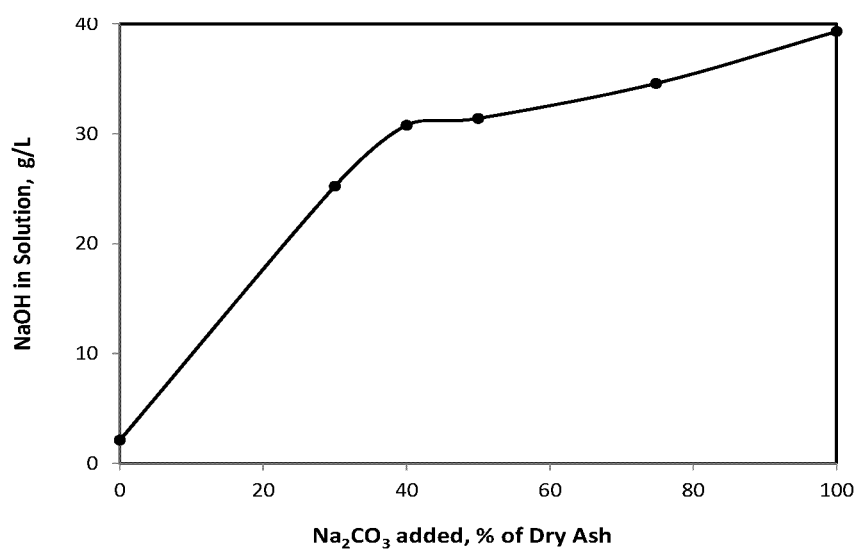
FIG. 2 shows a plot of NaOH concentration as a function of $Na_2CO_3$ amount in the process of FIG. 1.

With further reference to FIG. 2, data relating to the alkali recovery from a first power boiler ash sample is shown. Alkali leaches out of the first power boiler fly ash sample when it is solubilized in water (i.e., about 2 g/L with no $Na_2CO_3$). The alkali (i.e., NaOH) concentration increases as the amount of $Na_2CO_3$ added to the power boiler ash increases. As further shown in FIG. 2, the increase in NaOH concentration is steep at lower $Na_2CO_3$ quantities (e.g., between about 0% and about 40% of dry power boiler ash by weight) however it levels off possibly with the depletion of reacting metal oxides and hydroxides at higher $Na_2CO_3$ quantities (e.g., between about 40% and about 100% of dry power boiler ash by weight) or due to other process constraints such as kinetics and thermodynamics.

Figure 3:
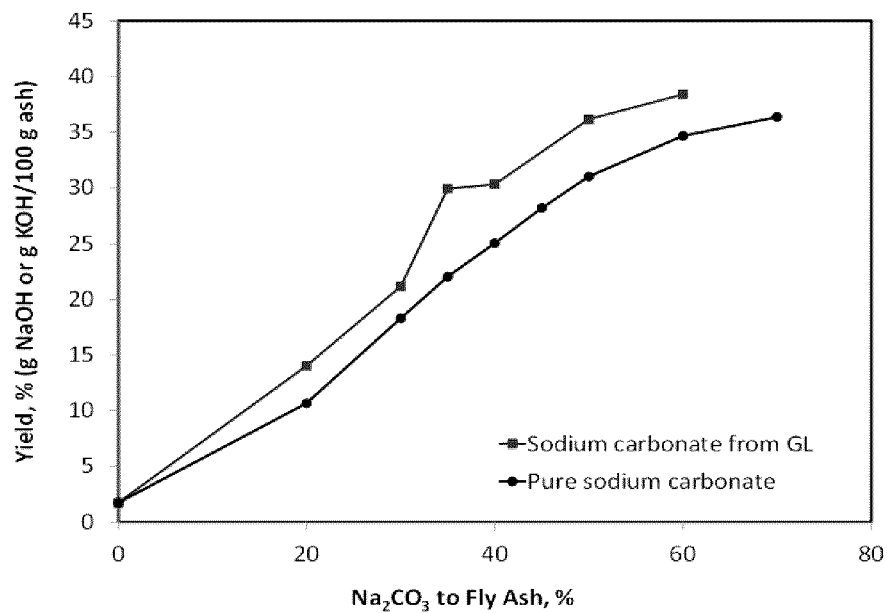
FIG. 3 shows a plot of alkali yield as a function of $Na_2CO_3$ amount, both pure and derived from green liquor, in the process of FIG. 1.

With further reference to FIG. 3, data relating to the alkali recovery from a second power boiler ash sample is shown using pure $Na_2CO_3$ and $Na_2CO_3$ present in GL or any similar stream from the pulp and paper or another industry. Much like in FIG. 2 above, the alkali yield increases with the $Na_2CO_3$ quantities. The alkali yield is also higher with the $Na_2CO_3$ present in GL compared to the pure $Na_2CO_3$, likely because at least some residual caustic is present in GL.

Table 3 below shows the quality (i.e. chemical composition) of the recovered alkali as a function of the $Na_2CO_3$ quantities. The alkali yield increases as the $Na_2CO_3$ quantities are increased. The quality of the recovered alkali varied with the $Na_2CO_3$ quantities. Most of the impurities were removed in the process and measured below detection (BD). Some sulfur was found to be present in the recovered product which, if used to maintain alkali/sulphur balance, would create additional value. For example, kraft pulp mills purchase sodium sulfate as a make-up chemical. The caustic provided herein can be used in the recovery cycle, wherein less sodium sulfate will have to be purchased to maintain the sodium sulfur balance. Further treatment or purification of the produced alkali solution can be performed if desired using ion exchange or membrane filtration or other separation approaches. For example, impurities such as chloride and potassium (and metals) can be removed using ion exchange technology. Water may also be used to leach soluble species out of the power boiling ash before reacting it with sodium carbonate.

TABLE 3

Chemical composition of recovered alkali as a function of $Na_2CO_3$ quantities

| | $Na_2CO_3$ to ash ratio, % | | | | |
|---|---|---|---|---|---|
| Elements | 0 mg/L | 10 mg/L | 20 mg/L | 30 mg/L | 50 mg/L |
| NaOH* | 2119 | 7822 | 17292 | 25231 | 31400 |
| Al | 0 | BD$^3$ | BD$^3$ | 781 | 2121 |
| As | BD | BD$^3$ | BD$^3$ | BD$^3$ | 6 |
| B | BD | BD$^3$ | 12 | 11 | 17 |
| Ba | 1 | BD$^1$ | BD$^1$ | BD$^1$ | BD$^1$ |
| Ca | 1912 | 460 | BD$^4$ | BD$^4$ | BD$^4$ |
| Cd | BD | BD$^1$ | BD$^1$ | BD$^1$ | BD$^1$ |
| Co | BD | BD$^1$ | BD$^1$ | BD$^1$ | BD$^1$ |
| Cr | 1 | 3 | 4 | 4 | 6 |
| Cu | BD | 0.3 | BD$^1$ | 1 | 1 |
| Fe | BD | 1 | 1 | 1 | 9 |
| K | 759 | 723 | 926 | 846 | 912 |
| Li | 0 | BD$^3$ | BD$^3$ | BD$^3$ | BD$^3$ |
| Mg | 0 | BD$^1$ | BD$^1$ | BD$^1$ | BD$^1$ |
| Mn | BD | BD$^1$ | BD$^1$ | BD$^1$ | BD$^1$ |
| Mo | 0.4 | 1 | 2 | 1 | 2 |
| Na | 366 | 7139 | 14400 | 20270 | 42900 |
| Ni | BD | BD$^1$ | BD$^1$ | BD$^1$ | BD$^1$ |
| P | BD | BD$^2$ | BD$^2$ | 3 | 30 |
| Pb | BD | BD$^3$ | BD$^3$ | 7 | 14 |
| S | 473 | 3018 | 4466 | 5718 | 6314 |
| Sb | BD | BD$^1$ | BD$^1$ | 1 | 2 |
| Se | BD | BD$^2$ | BD$^2$ | BD$^2$ | BD$^2$ |
| Si | BD | BD$^3$ | 12 | 65 | 368 |
| Sr | 14 | 7 | 2 | 0.3 | BD$^1$ |
| Ti | BD | BD$^1$ | BD$^1$ | BD$^1$ | BD$^1$ |
| V | BD | BD$^1$ | 0.4 | 0.3 | 2 |
| Zn | 1 | 3 | 12 | 44 | 127 |
| Cl$^-$ | | 1329 | 1279 | 1363 | 1544 |

Figure 4:
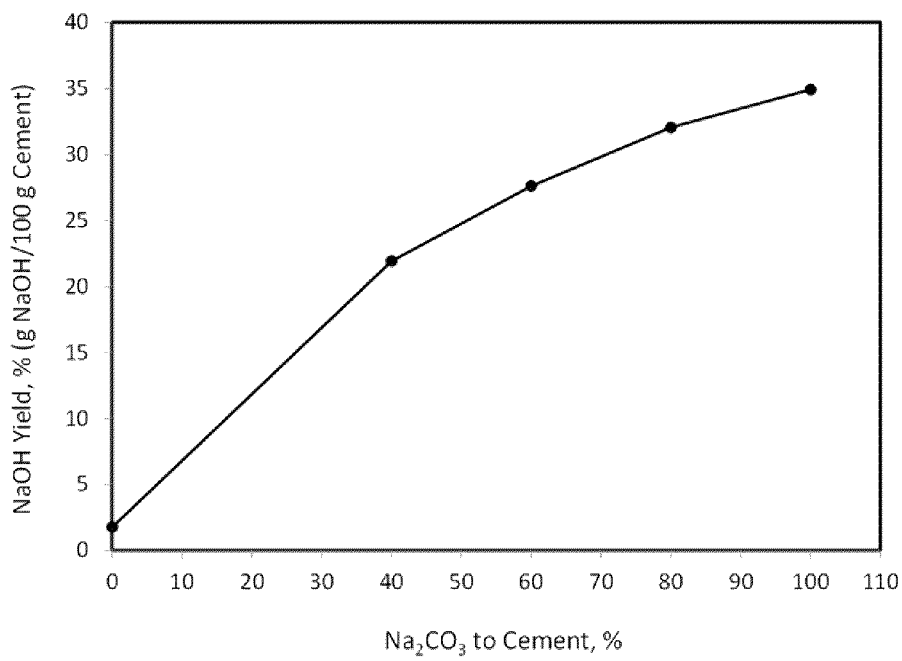
FIG. 4 shows a plot of alkali yield as a function of $Na_2CO_3$ amount, in a process for recovering alkali from cement in accordance with another embodiment.

BD: below detection;
MDL: method detection limit;
BD$^1$: MDL 0.005 ppm;
BD$^2$: MDL 0.01 ppm;
BD$^3$: MDL 0.1 ppm;
BD$^4$: MDL 1 ppm With further reference to FIG. 4, data relating to the alkali recovery from Portland cement is also shown, with an alkali yield of at least 20%, in some cases at least 30%, in some cases at least 35% and in some cases even more with up to 100% $Na_2CO_3$.

While this disclosure has been described in connection with specific embodiments thereof, it will be understood that it is capable of further modifications and this application is intended to cover any variations, uses, or adaptations, including such departures from the present disclosure as come within known or customary practice within the art, and as may be applied to the essential features hereinbefore set forth, and as follows in the scope of the appended claims.

What is claimed is:

1. A process for recovering alkali from power boiling ash materials comprising the steps of:
   contacting the power boiling ash materials containing a mixture of metal oxides and hydroxides with a Na COs solution to obtain a slurry at a temperature of from 20 to 100° C., wherein the slurry comprises settling solid particles, non-settling solid particles and alkali generated during the contacting step, and wherein the power boiling ash materials are ash, bottom ash or combined ash; and
   separating a fraction of the solid particles from the slurry to obtain a clarified alkaline solution,
   wherein the temperature of from 20 to 100° C. is maintained throughout the contacting step and the separating step.

2. The process of claim 1, wherein the power boiling ash materials further comprise CaO, MgO, Ca(OH), or a combination thereof.

3. The process of claim 1, wherein the $Na_2CO_3$ is derived from waste or process liquor from an industrial plant.

4. The process of claim 1, wherein the $Na_2CO_3$ has a concentration of between about 5% and about 90% of the power boiling ash materials by dry weight.

5. The process of claim 1, wherein the concentration of alkali in the clarified alkaline solution is between about 2 g/L and about 85 g/L.

6. The process of claim 1, wherein an alkali yield defined as a mass of alkali in g per 100 g mass of metal oxide/hydroxide containing material is at least 2%.

7. The process of claim 6, wherein the alkali yield is at least 35%.

8. The process of claim 1, further comprising separating a fraction of the non-settling solid particles from the clarified alkaline solution to obtain a second clarified alkaline solution.

9. The process of claim 8, wherein separating the fraction of non-settling solid particles comprises using a pulse filter, a membrane-based separation unit, a pressure filter, vacuum filter, filter press, a fabric filter, a centrifuge or any combination thereof.

* * * * *